(12) United States Patent
Olivares et al.

(10) Patent No.: US 9,762,515 B1
(45) Date of Patent: Sep. 12, 2017

(54) INTERACTIVE ONLINE ENTERTAINMENT SYSTEM AND METHOD

(71) Applicants: Eddy Olivares, Guangzhou (CN); Dan Liu, Guangzhou (CN)

(72) Inventors: Eddy Olivares, Guangzhou (CN); Dan Liu, Guangzhou (CN)

(73) Assignee: Danxiao Information Technology Ltd., Guangdong (CN)

( * ) Notice: Subject to any disclaimer, the term of this patent is extended or adjusted under 35 U.S.C. 154(b) by 0 days.

(21) Appl. No.: 15/143,513

(22) Filed: Apr. 30, 2016

(51) Int. Cl.
  *G08C 19/16* (2006.01)
  *H04L 12/58* (2006.01)
  *H04W 4/00* (2009.01)
  *H04L 12/18* (2006.01)
  *H04L 29/08* (2006.01)

(52) U.S. Cl.
  CPC ........ *H04L 51/046* (2013.01); *H04L 12/1813* (2013.01); *H04L 67/025* (2013.01); *H04W 4/008* (2013.01)

(58) Field of Classification Search
  CPC .................. A61H 19/44; A61H 19/50; A61H 2201/5007; A61H 2201/5012; A61H 19/32; A61H 19/34; A61H 19/40; A61H 2205/086; A61F 5/00; A61F 5/41; A63F 13/12; A63F 13/218; A63F 13/285; A63F 2300/302; H04L 67/02; H04L 67/025; H04L 67/04; H04L 67/12; H04L 67/38; H04L 51/046; H04L 12/1813; H04W 84/00; H04W 4/008
  See application file for complete search history.

(56) References Cited

U.S. PATENT DOCUMENTS

| | | | | |
|---|---|---|---|---|
| 6,368,268 B1* | 4/2002 | Sandvick | ............... | A61H 19/44 600/38 |
| 6,786,863 B2* | 9/2004 | Abbasi | ..................... | G06F 3/016 600/38 |
| 7,347,815 B2* | 3/2008 | Serbanescu | ............ | A61H 19/34 600/38 |
| 7,395,126 B2* | 7/2008 | Decker | .................. | G08C 17/00 700/17 |

(Continued)

OTHER PUBLICATIONS

"Lovense Interactive Sex Toys for Cam Models", URL: https://web.archive.org/web/20160302191610/http://Lovense.com/cam-model? pp. 1-4, Mar. 2, 2016.*

*Primary Examiner* — Nay Tun
(74) *Attorney, Agent, or Firm* — Steinberg Intellectual Property Law LLC; Gloria M. Steinberg, Esq.

(57) ABSTRACT

Disclosed is a system and method for allowing one or more users to interact with models from a distance, for example, by enabling the users to tip the models during online video chat sessions, wherein the models can define tipping parameters to perform predefined acts, via an adult toy, based on the amount of tips received. The adult toy can be Wi-Fi or Bluetooth™ enabled to receive commands directly from the server via a web browser extension, the website hosting an online video chat session, or connect to an application installed on a device operated by the model, wherein the application communicates with the web browser extension to relay commands to the adult toy therefrom. In some embodiments, the browser extension or website can generate live control links to enable certain users have a live control of the model's adult toy.

18 Claims, 10 Drawing Sheets

(56) References Cited

U.S. PATENT DOCUMENTS

| | | | |
|---|---|---|---|
| 8,378,794 B2 * | 2/2013 | Alarcon | A61H 19/32 340/407.1 |
| 8,608,644 B1 | 12/2013 | Davig | |
| 8,936,544 B2 * | 1/2015 | Shahoian | A61H 19/30 600/38 |
| 2002/0083179 A1 | 6/2002 | Shaw | |
| 2004/0082831 A1 | 4/2004 | Kobashikawa | |
| 2004/0132439 A1 | 7/2004 | Tyagi | |
| 2004/0167855 A1 * | 8/2004 | Cambridge | A61H 19/32 705/42 |
| 2005/0027794 A1 * | 2/2005 | Decker | G08C 17/00 709/201 |
| 2006/0015560 A1 | 1/2006 | Macauley | |
| 2006/0106466 A1 * | 5/2006 | Decker | H04L 67/125 700/1 |
| 2007/0055096 A1 * | 3/2007 | Berry | A61H 19/44 600/38 |
| 2007/0202941 A1 * | 8/2007 | Miltenberger | G07F 17/32 463/25 |
| 2008/0119767 A1 * | 5/2008 | Berry | A61H 19/34 601/46 |
| 2009/0099413 A1 * | 4/2009 | Kobashikawa | A61H 19/34 600/38 |
| 2009/0258688 A1 * | 10/2009 | Yoshizawa | G07F 17/32 463/11 |
| 2011/0133910 A1 * | 6/2011 | Alarcon | A61H 19/32 340/407.1 |
| 2014/0370957 A1 * | 12/2014 | Hadida | G07F 17/32 463/17 |

* cited by examiner

INTERACTIVE ONLINE ENTERTAINMENT SYSTEM AND METHOD

FIELD OF THE INVENTION

The present invention generally relates to telecommunications. More particularly, the present invention is directed to methods and systems for interactive online adult entertainment.

BACKGROUND OF THE INVENTION

Chat rooms are widely used to allow two or more users usually located at different locations to communicate. Generally, chat rooms utilize text input by the users that can be displayed in real-time for providing a written transcript of a conversation. Some forms of chatting incorporate video and audio so that two or more users can view some or all of the users from different locations in real-time while conversing.

Some chat rooms provide adult content to provide entertainment for adults. In this regard, existing adult chat rooms generally function similarly to conventional chat rooms. Current challenge for adult chat rooms is to provide the right kinds of interactivity and real world features to provide enjoyable experiences to users and can therefore be attractive to a large number and wide range of users. In this regard, the invention described herein addresses this problem.

SUMMARY OF THE INVENTION

In view of the disadvantages inherent in the known types of systems for chat rooms and communication systems now present in the prior art, the present invention provides an improved interactive online communication system for adult entertainment.

The following discloses a simplified summary of the specification in order to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as to prelude to the more detailed description that is disclosed later.

Some embodiments include, for example, devices, systems, and methods of providing adult entertainment via online chat sessions and interactive shows.

Some embodiments include a system comprising a server with a memory having stored thereon instructions, and a processor to execute the instructions resulting in a web browser extension or an adult video chatting website for allowing users to interact with models from a distance, for example, by tipping the models during an online video chat session on a website, wherein the models can define tipping parameters to perform predefined acts, via an adult toy or another stimulation device, based on the amount of tip received.

In some embodiments, the web browser extension is to receive tip parameters defining valid tip ranges; and to automatically identify whether a received tip amount is valid based on a criterion related to the tip parameters. If the tip amount is valid, the web browser extension is to communicate with the adult toy to actuate the same. In this regard, the adult toy can be Wi-Fi-enabled to receive commands directly from the server via the web browser extension. Alternatively, the adult toy can be connected via Bluetooth™ (or via another short-range wireless interconnection) to an application installed on a device operated by the model, wherein the application communicates with the web browser extension to relay commands to the adult toy therefrom.

In some embodiments, two or more users can interact with one model across multiple platforms simultaneously via different chat rooms on various websites. In this way, one model can perform online shows and receive tips from multiple users in one or more online chat sessions at the same time.

In some embodiments, the browser extension is configured to generate live control links so as to allow certain users to control the model's adult toy for a limited or unlimited amount of time via a virtual control panel. The browser extension is further configured to automatically cancel previously generated links each time a new link is generated, or automatically cancel expired links. Alternatively, the browser extension can form a queue or add users to a queue of multiple live control links. In this way, multiple users can take turns to control the model's adult toy.

In the light of the foregoing, these and other objects are accomplished in accordance of the principles of the present invention, wherein the novelty of the present invention will become apparent from the following detailed description and appended claims.

BRIEF DESCRIPTION OF THE DRAWINGS

The above and other objects and advantages of the present invention will be apparent upon consideration of the following detailed description, taken in conjunction with the accompanying exemplary drawings, in which like reference characters refer to like parts throughout, and in which.

DETAILED DESCRIPTION OF THE INVENTION

Figure 1:
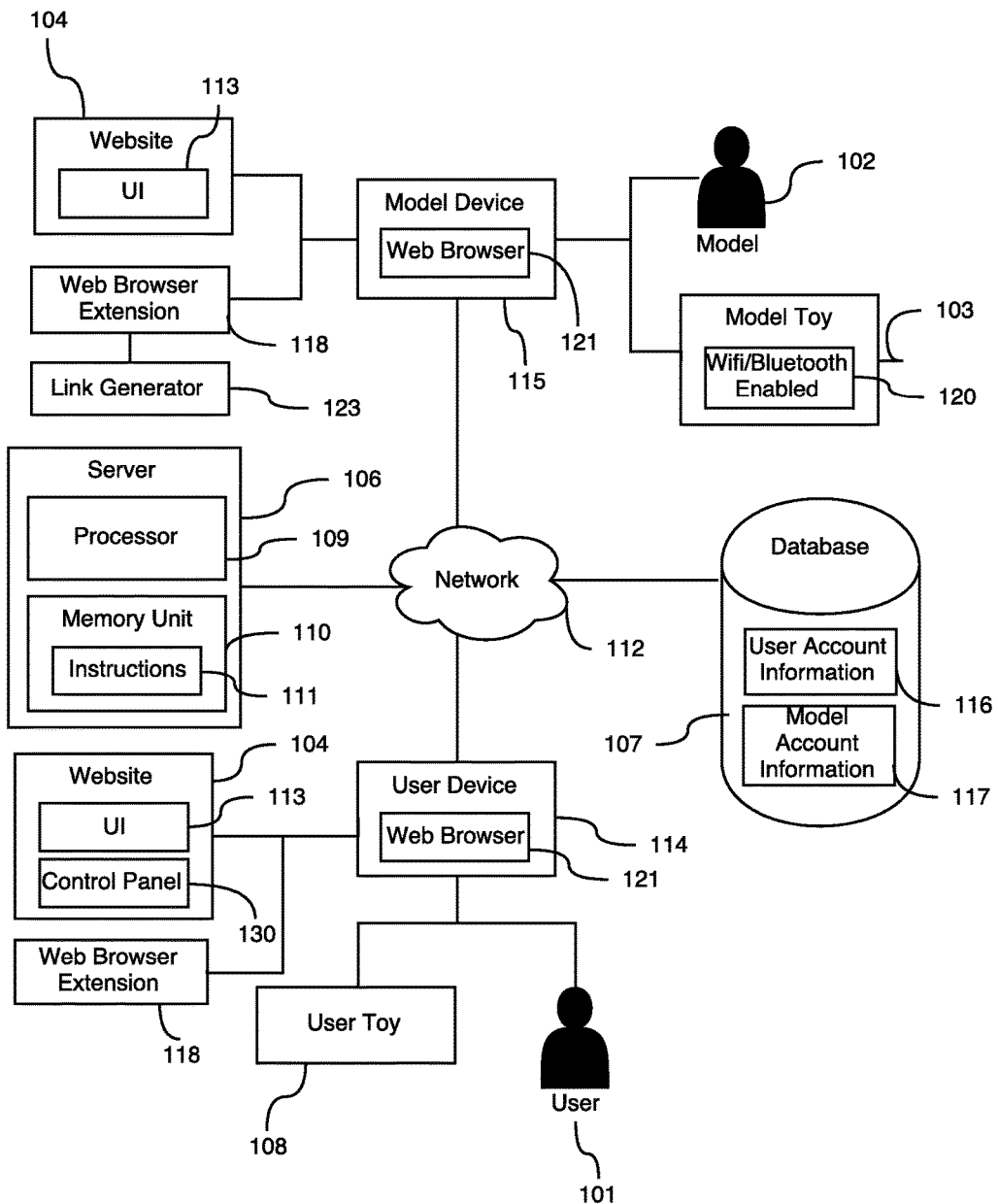
FIGS. 1 and 2 show high-level block diagrams of the present system.

The present invention is directed towards a communication system and method that can actuate adult toys over distances. For purposes of clarity, and not by way of limitation, illustrative views of the present system and method are described with references made to the above-identified figures. Various modifications obvious to one skilled in the art are deemed to be within the spirit and scope of the present invention.

As used in this application, the terms "component," "module," "system," "interface," or the like are generally intended to refer to a computer-related entity, either hardware or a combination of hardware and software. For example, a component can be, but is not limited to being, a process running on a processor, an object, and/or a computer. By way of illustration, both an application running on a controller and the controller can be a component. One or more components can reside within a process and/or thread of execution and a component can be localized on one computer and/or distributed between two or more computers. As another example, an interface can include I/O components as well as associated processor, application, and/or API components.

It is to be appreciated that determinations or inferences referenced throughout the subject specification can be practiced through the use of artificial intelligence techniques. In this regard, some portions of the following detailed description are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Furthermore, the claimed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, or media.

Discussions herein utilizing terms such as, for example, "processing," "computing," "calculating," "determining," "establishing," "identifying," "analyzing," "checking," or the like, may refer to operations(s) and/or process(es) of a computer, a computing platform, a computing system, or other electronic computing device, that manipulate and/or transfer data represented as physical (e.g., electronic) quantities within the computer's registers and/or memories into other data similarly represented as physical quantities within the computer's registers and/or memories or other information storage medium that may store instructions to perform operations and/or processes.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to disclose concepts in a concrete fashion. As used in this application, the term "or" is intended to mean an inclusive "or" rather than an exclusive "or."

Additionally, the articles "a" and "an" as used in this application and the appended claims should generally be construed to mean "one or more" or "at least one" unless specified otherwise or clear from context to be directed to a singular form. Similarly, the terms "plurality" and "a plurality" as used herein includes, for example, "multiple" or "two or more." For example, "a plurality of items" includes two or more items. As used herein, the terms "user," "users," "end user," "end users," "audience," "client," "clients," "customer," and "customers" are interchangeable unless the context clearly suggests otherwise. Similarly, as used herein, the terms "model," "models," "performer," "performers," are used interchangeably unless the context clearly suggests otherwise. The terms "web browser extension," "browser extension," and "website" are used interchangeably unless the context clearly suggests otherwise. Furthermore, the foregoing terms "web browser extension," "browser extension," and "website" may be collectively referred to as "application," "software," or "software application."

Some embodiments of the present invention may include one or more wired or wireless links, may utilize one or more components of wireless communication, may utilize one or more methods or protocols of wireless communication, or the like. Some embodiments may utilize wired communication and/or wireless communication.

Some embodiments may be used in conjunction with various devices and systems, for example, a personal computer (PC), a desktop computer, a mobile computer, a laptop, a tablet computer, a server computer, a handheld device, a personal digital assistant (PDA), a wireless communication device, a smart phone, a non-portable device, a wireless access point (AP), a wired or wireless router, a wired or wireless modem, a wired or wireless network, a local area network (LAN), a wireless LAN (WLAN), a metropolitan area network (MAN), a wireless MAN (WMAN), a wide area network (WAN), a wireless WAN (WWAN), a personal area network (PAN), a wireless PAN (WPAN), or networks operating in accordance with existing and/or future versions and/or derivatives of long term evolution (LTE), a device which incorporates a global positioning system (GPS) receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, or the like.

Figure 2:
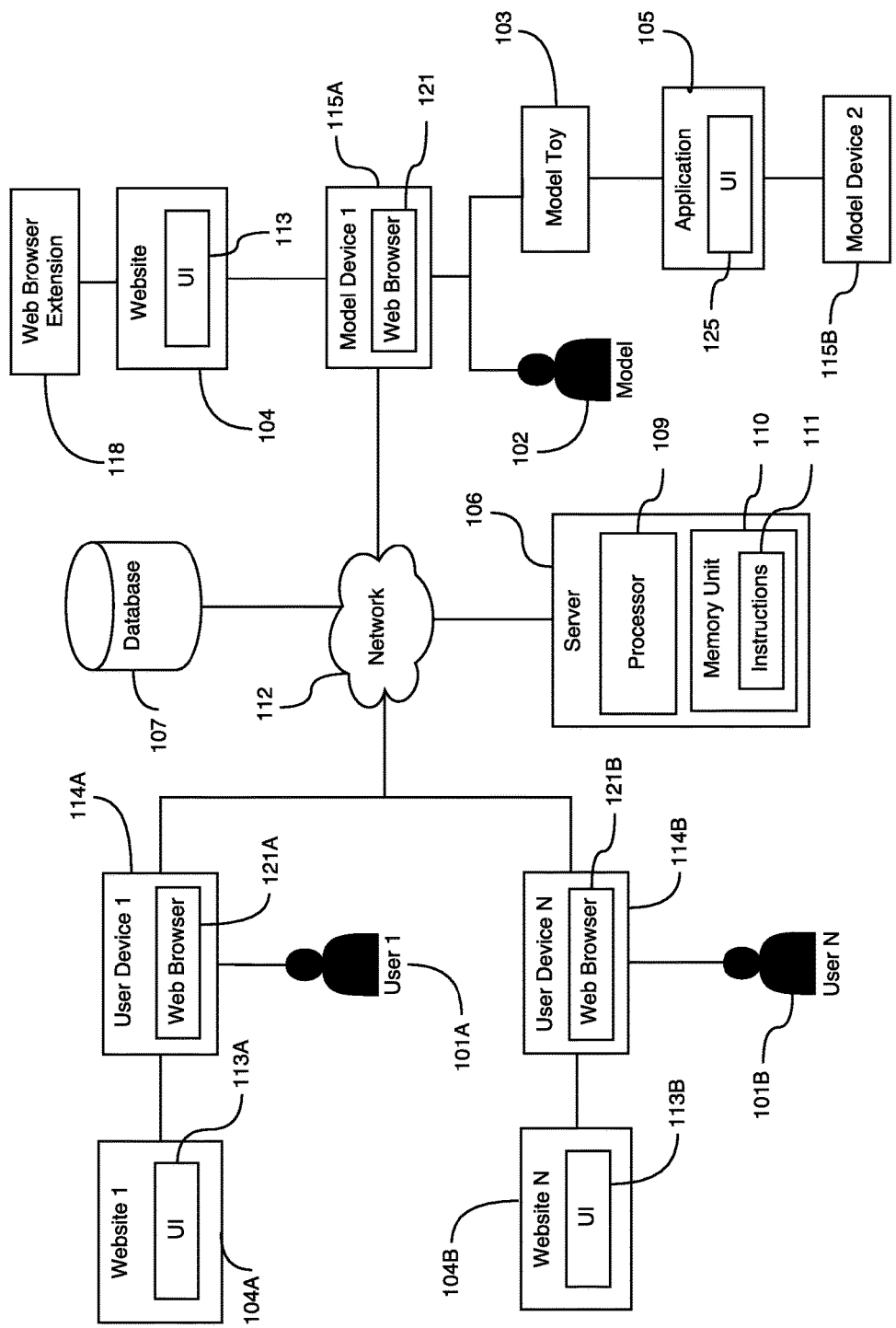

Referring now to FIGS. 1 and 2, there are shown high-level block diagrams of the present system in accordance with some embodiments of the present invention. In one embodiment, the present invention comprises a user device 114 that is operated by a user 101, wherein the user device 114 comprises a wide variety of computer systems and/or a terminal that allow the user 101 to access a web browser 121 on which the user 101 can access a website 104 to engage in an online chat with a model 102 via a user interface (UI) 113 of the website 104. In this regard, the device 114 may be implemented using suitable hardware components and/or software components, for example, processors, controllers, memory units, storage units, input units, output units, communication units, operating systems, applications, or the like.

The present system further comprises a model device 115 that is operated by a model 102. The model device 115 also comprises a variety of computer systems and/or a terminal that allow the model 102 to access a web browser 121 on which the model 102 can access the website 104 to engage in an online chat with the user 101 via a UI 113 of the website 104. In this regard, the device 114 may be implemented using suitable hardware components and/or software components, for example, processors, controllers, memory units, storage units, input units, output units, communication units, operating systems, applications, or the like.

In some embodiments, the model device 115 comprises an application 105 (e.g., non-downloadable or downloadable mobile application, web application, mobile application) stored thereon. Alternatively, the model 102 comprises a second model device 115B having the application 105 installed thereon. The application 105 communicates with the model toy 103 so as to send commands thereto (FIG. 2), wherein the model toy 103 comprises various types of adult toys and stimulation devices. It is contemplated that the application 105 comprises a UI 125 for manually controlling the model toy 103, for example, by transmitting signals to turn the model toy 103 on and off and vibrate the model toy 103. In other embodiments, however, it is contemplated that the model toy 103 is Wi-Fi or Bluetooth™ enabled 120 (or enabled via other suitable short-range wireless interconnection) so as to allow the model toy 103 to directly communicate with the web browser 121 via the model device 115 (FIG. 1) and receive commands therefrom without the application 105 when the model toy 103 is turned on. In this regard, the model toy 103 is configured to receive signals from the model device 115 and/or the web browser 121. In some embodiments, the system further comprises a user toy 108 (i.e., Wi-Fi-enabled or Blutooth™ enabled) that can communicate with the web browser extension 118 of the web browser 121 on the user device 114. It is contemplated that the user toy 108 operates similarly to the model toy 103.

The website 104 is configured to allow the user 101 and the model 102 to set up a user account and a model account, respectively. In this regard, the user 101 can create his or her user name and password and input payment information, among other types of information associated with the user. Similarly, the model 102 can create a model account by inputting the model's name, age, gender, location, and the like. The user account information 116 and the model account information 117 are stored in a database 107 that is connected to the network 112 of the present system.

The user 101 can select a model 102 from a group of models to enter into an online chat session, via the website 104. In this regard, the chat session can be a private (i.e., one-on-one) session, a group session (i.e., limited number of users and one model), or a public session (i.e., unlimited number of users). Each model 102 can define and edit tip parameters that are used during each chat session. In one embodiment, the website 104 allows the model to designate specific tip amounts and/or ranges of tip amounts and actions correlating to each of the tip amounts and/or ranges. In this regard, the website 104 is configured to recognize tip amounts and send commands to the toy 103 either directly (if the toy is Wi-Fi enabled 120) or via the application that is connected to the model toy 103. In another embodiment, the model can use the web browser extension 118 to input the foregoing parameters. It is noted that as used herein, the terms "action," "actions," "act," and "acts" mean the model's performances, the model's use of the model toy 103 and/or the operation of the model toy 103 (e.g., vibrating, rotating, thrusting, oscillating, etc.). For example, the model 102 can set tip parameters such that tip amounts between 1 to 10 tokens may cause the model toy 103 to vibrate at a low speed for 10 seconds, and tip amounts between 11 to 20 tokens may cause the model toy 103 to thrust at a high speed for 10 seconds. Alternatively, a tip amount of 30 tokens may cause the model toy 103 to rotate at a high speed for 15 seconds.

The UI 113 of the website 104 is an interface between the user 101 and one or more elements of the present system (e.g., the website 104), the web browser extension 118, or between the model 102 and one or more elements of the present system. In this regard, the UI 113 of the website 104 allows the user 101 and the model 102 to input and receive messages in a textual format so as to have a live conversation with each other (e.g., in an online chat room). Additionally, the website 104 is further configured to provide a UI 113 comprising audio and video (i.e., during an online video chat session) so that the user 101 can view and listen to the model 102 during a chat session. In some embodiments, the present invention may comprise other downloadable and/or a non-downloadable software application (e.g., a web application, a mobile application) in lieu of the website 104.

The server 106 comprises a memory unit 110 having instructions 111 stored thereon, and a processor 109, wherein the processor 109 is configured to execute the instructions 111 resulting in a software such as the web browser extension 118 or the website 104, wherein the web browser extension 118 or the website 104 is configured to scan for tips during chat sessions and receive tips from the user 101. The web browser extension 118 or the website 104 can determine whether the received tip falls within one of the tip parameters or whether the tip is equal to a specified tip amount defined by the model 102. For example, if one of the tip parameters is 1 to 10 tokens to vibrate the model toy 103 at a low speed for 10 seconds, and the user tips 4 tokens, then the tip amount is valid. If, however, one of the tip parameters is 11 to 20 tokens to vibrate the model toy 103 at a high speed for 10 seconds, and the user wishes to vibrate the model toy 103 at a high speed instead of a low speed, the tip amount is not valid and the user may be prompted to adjust (i.e., increase) the tip amount, in some embodiments. Alternatively, the model toy 103 can still react as long as the tip falls in one of the tip parameters. It is contemplated that the user 101 can purchase credits, points, or other types of virtual currency such as tokens that can be credited to his or her account 116 and use the virtual currency to tip the model 102.

If the web browser extension 118 or the website 104 determines that the received tip falls within one of the tip parameters, it actuates the model toy 103 in accordance with the tip amount. Alternatively, if the web browser extension 118 or the website 104 determines that the received tip falls within one of the tip parameters, it signals the application 105 to actuate the model toy 103. It is contemplated that the received tip amounts are credited to the model's account 117 and made redeemable by the respective model at a later time. If the web browser extension 118 determines that the received tip does not fall into any of the tip parameters, the web browser extension 118 may be configured to send a notification to the user 101 indicating that the tip amount is insufficient.

In some embodiments, the web browser extension 118 or the website 104 comprises a link generator 123 for generating live control links and transmitting the links to users 101 that are designated by the model 102. It is contemplated that the link generator 123 comprises a button that can be clicked, tapped, or otherwise activated to automatically generate new live control links, via the server 106, and cancel previously generated live control links. The model 102 can set parameters to define the duration for which the model 102 would permit the user 102 to control the model toy 103. In this way, the live control links allow certain users 101 to control the model toy 103 for a limited or an unlimited time, wherein the users 101 can control the model toy 103 via a virtual control panel 130 that is accessible when the live control link is used. The live control link may be available to the user 101 while the user 101 is in a chat session. If more than one user 101 receives a live control link, then the web browser extension 118 or the website 104 creates a queue to add additional links, for example, in the order accessed.

Some embodiments of the present system comprise two or more users 101A, 101B in communication with one model 102 at the same time, wherein each of the users 101A, 101B operates a user device 121A, 121B for accessing the website 104A, 104B via the web browser 121A, 121B. In this regard, the first user 101A and the second user 101B can use different web browsers so that the first web browser 121A and the second web browser 121B need not be the same. Additionally, each user 101A, 101B can visit different websites to enter into an online chat session with the model 102 such that the first website 104A and the second web site 104B need not be the same.

In this regard, the model 102 can broadcast on multiple platforms simultaneously (referred hereto as "split-camming") so that each user 101A, 101B can view the model via, for example, UI 113A, 113B, and tip the model 102. One model and two or more users 101A, 101B can be in a single chat session. When multiple users 101A, 101B tip the model 102, the web browser extension 118 or the website 104 can form a queue and build on tips received. For example, the model toy 103 can react to a first tip received, and then react to a second tip received, wherein the first tip is received before the second tip. If the first user 101A tips the first tip and the second user 101B tips the second tip, then the each of the users may be notified when the model toy 103 is reacting to their respective tip amounts. Alternatively, one model 102 can be in multiple chat sessions with individual users 101A, 101B (i.e., one chat session per user). In this regard, the web browser extension 118 can scan all of the websites 104A, 104B simultaneously for tips to actuate the model toy 103 or to signal the application 105 to make the model toy 103 react based on the received tip amounts.

In some embodiments, one user 101 may enter into multiple chat sessions with multiple models simultaneously. In this regard, the web browser extension 118 for each model 102 can scan for tips designated for that model 102 and actuate the model toy 103 belonging to the respective model 102, or signal the model's application 105 to actuate the model toy 103.

Reference is also made to FIGS. 3A, 3B, 4, and 5, which schematically illustrates exemplary methods of interactive online communication for adult entertainment. In some embodiments, one or more of the operations of FIGS. 3A through 5 may be performed by one or more elements of the system (e.g., web browser extension 118 (FIGS. 1, 2)).

Figure 3A:
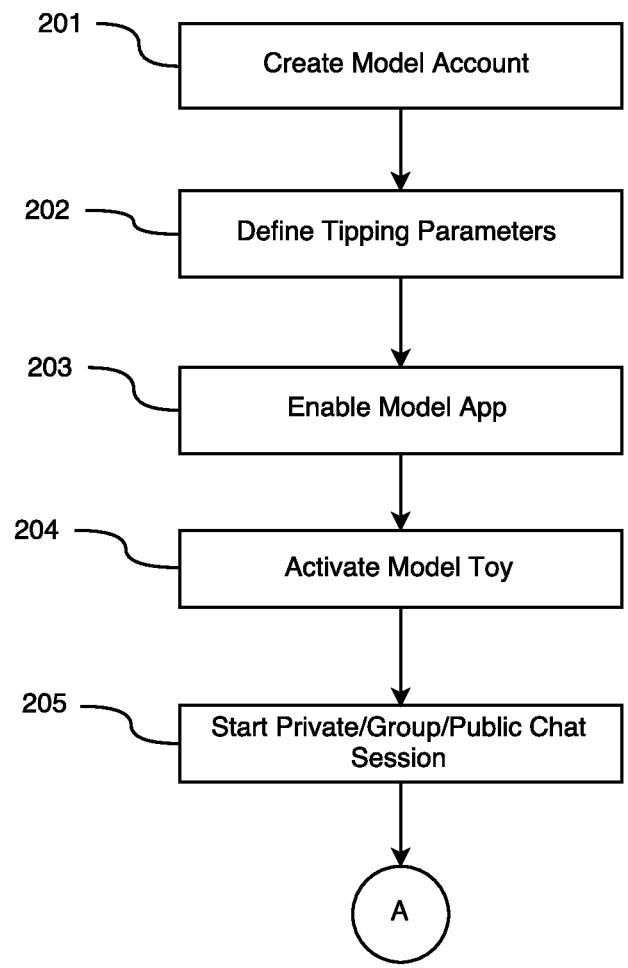
FIGS. 3A, 3B, 4, and 5 show exemplary flow charts of the present method.
Figure 3B:
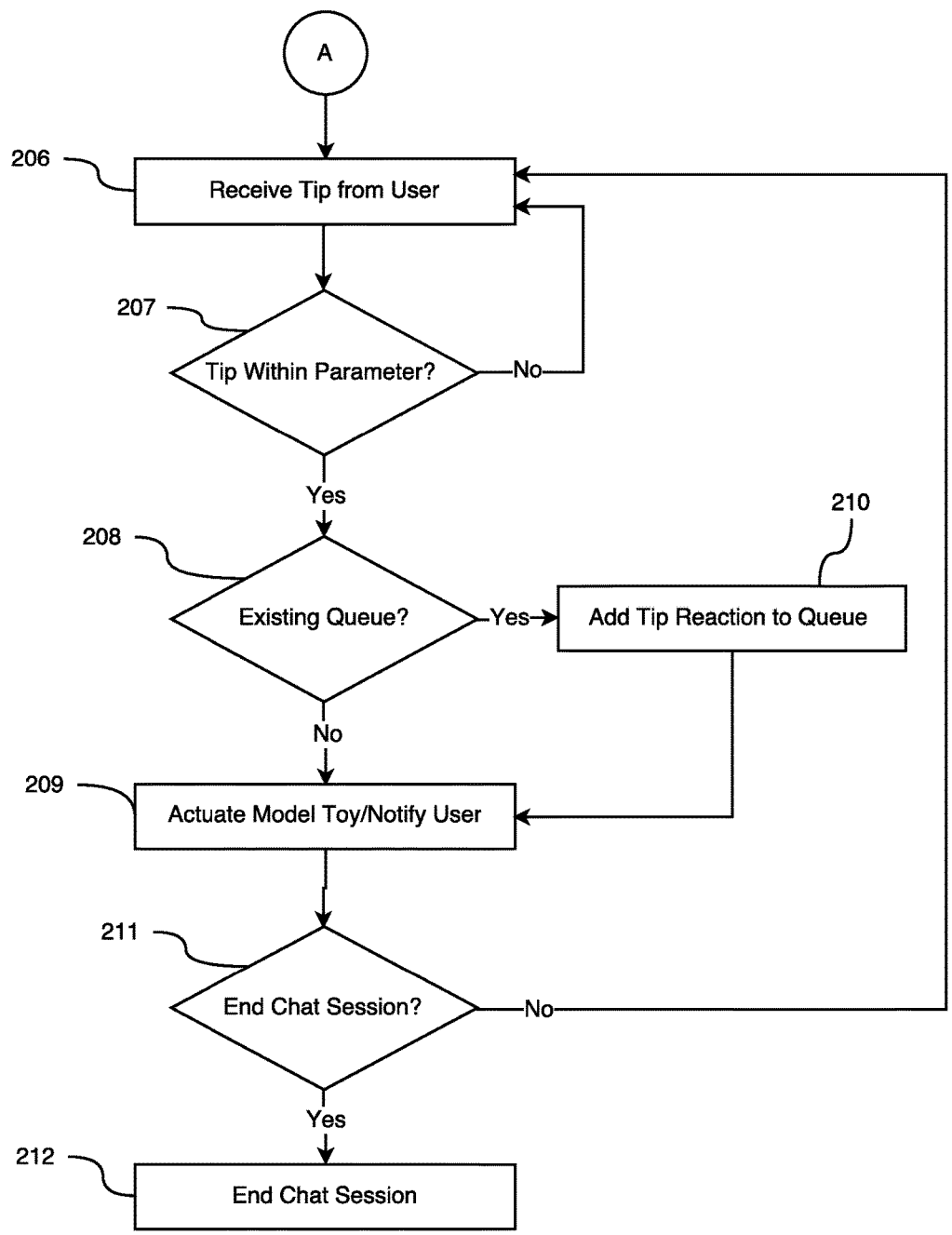

One embodiment for the present method in operation is illustrated in FIGS. 3A and 3B. As indicated in block 201, the method may include creating a model account via a website 104 (FIGS. 1, 2), wherein the model account includes information associated with the model such as the model's name, age, gender, location, and the like. As indicated in block 202, the method may include defining tipping parameters via the website 104 or the web browser extension 118 (FIGS. 1, 2), wherein the tipping parameters can be determined by the model such that the parameters can vary from a model to a model, and wherein the tipping parameters include specific tip amounts or one or more ranges of tip amounts and acts corresponding thereto. For example, tip amounts between 1 to 10 tokens may cause the model toy to vibrate at a low speed for 10 seconds, and tip amounts between 11 to 20 tokens may cause the model toy to vibrate at a high speed for 10 seconds.

Optionally, as indicated in block 203, the model can enable the application 105 (FIG. 2) stored on the model device 115 (FIGS. 1, 2), if the model toy 103 (FIGS. 1, 2) is not Wi-Fi-enabled. The application 105 (FIG. 2) can activate the model toy 204 before the model enters into a chat session with a user. If the model toy is Wi-Fi-enabled 120 (FIGS. 1, 2), the application 105 (FIG. 2) may not be needed and the model toy 103 (FIGS. 1, 2) can be activated 204 via a control button (i.e., a power switch or button) disposed on the model toy 103 (FIGS. 1, 2).

As indicated in block 205, the model can start a chat session (i.e., a private session, a group session, or a public session) with a client via any online chat platform, including a third party platform. The model can receive tips from a client 206 during a chat session. When the model receives a tip, the web browser extension 118 or the website 104 (FIGS. 1, 2) determines whether the tip is within the model's tip parameters 207. If the tip amount received falls within one of the tip parameters, the web browser extension 118 (FIGS. 1, 2) determines whether there is an existing queue 208. If there is no existing queue, the model toy is actuated 209 via the application 105 (FIG. 2) of the model device 115 (FIGS. 1, 2). Alternatively, the web browser extension 118 (FIG. 1) may be configured to directly actuate the Wi-Fi-enabled 120 (FIG. 1) model toy 103 (FIG. 1). If there is a queue, the tip reaction is added to the queue 210, wherein the tip reaction is added in order received.

In some embodiments, if the tip does not fall within any of the tip parameters or meet a specific tip amount, the web browser extension 118 (FIG. 1, 2) can notify the user to indicate that the tip did not fall within the model's tip parameters and that the user needs to adjust (i.e., increase) the tip amount. Alternatively, no actions are taken if the tip amount does not fall within any of the tip parameter. The user can continue tipping the model until the chat session ends.

As indicated in block 211, if the model indicates that it is the end of a chat session, the chat session is ended 212. The user may or may not be able to end the chat session. For instance, the user may be able to end the chat session if the chat session is a private session. However, the user may not be able to end the chat session if the chat session is a group session or a public session. Alternatively, the chat session can automatically end 212 if the chat session is valid for only a predetermined period of time.

Figure 4:
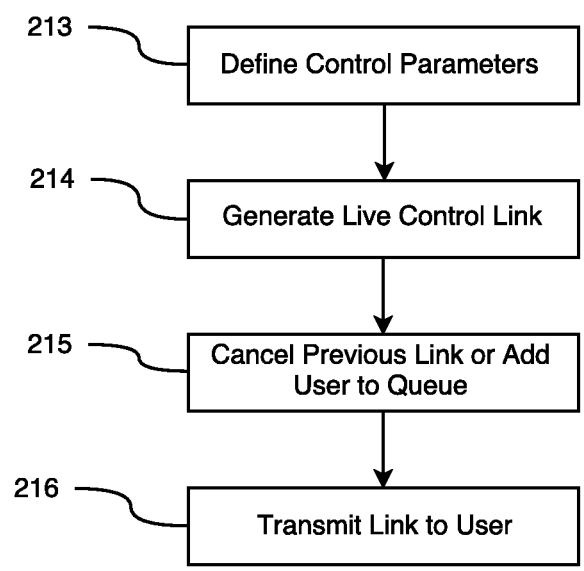

Exemplary steps for generating a live control link are illustrated in FIG. 4. Optionally, the model can generate a live control link via the link generator 123 (FIGS. 1, 2). If the model generates a live control link, the model can define the control parameters (e.g., amount of time a user can control the model toy) as indicated in block 213. Once the control parameters are defined, the link generator generates a live control link 214 via the server 106 (FIGS. 1, 2). The link generator may automatically cancel or invalidate previously generated links so that only valid links can be activated 215. Alternatively, the link generator may create a queue if more than one live control links is distributed to multiple users 215. The generated links are transmitted to users 216 via various messaging systems, for example, by email. The live control link can be used while the user is in a chat session (i.e., a private session, a group session, or a public session) or when the user is not in a chat session.

Figure 5:
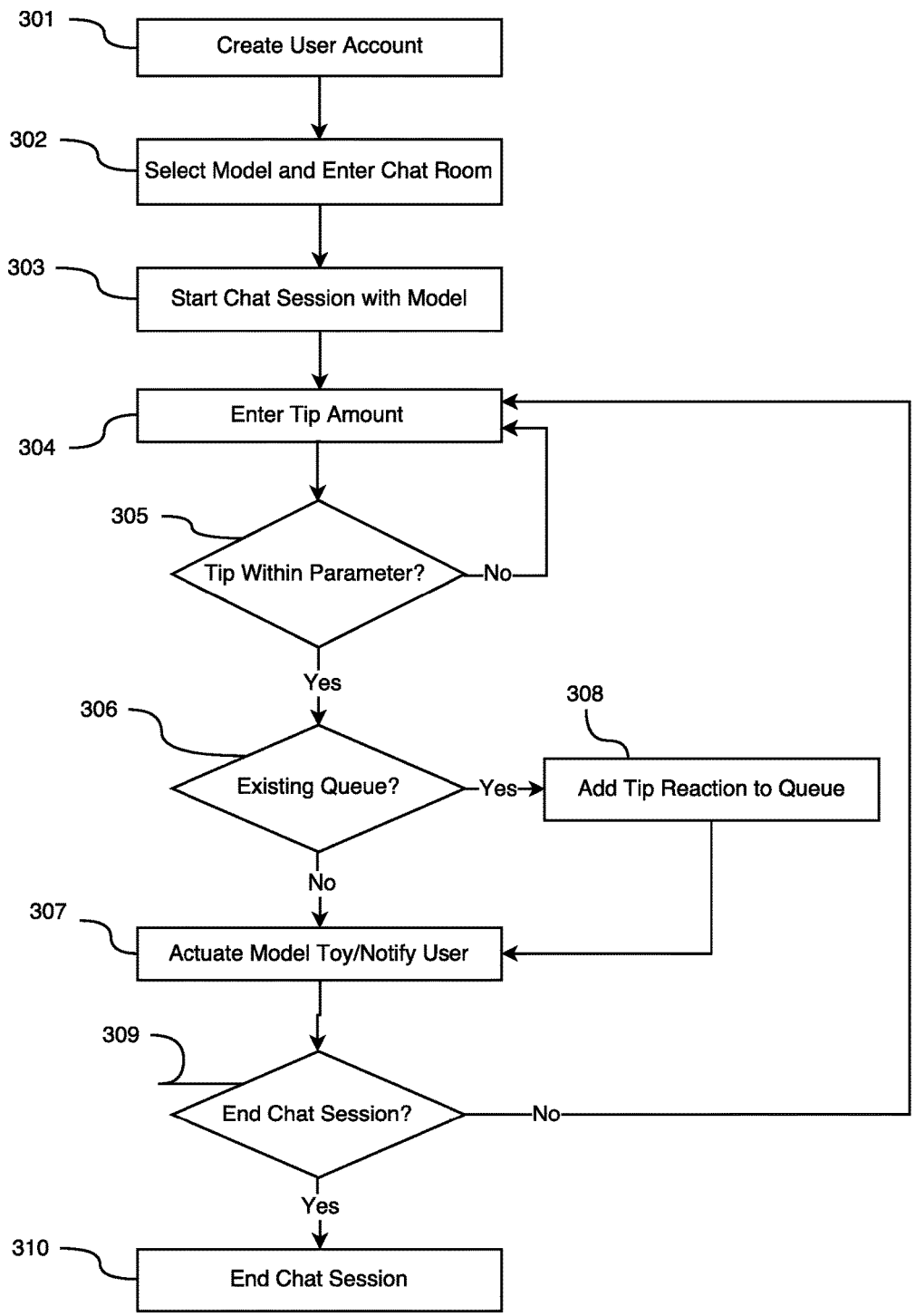
Figure 6:
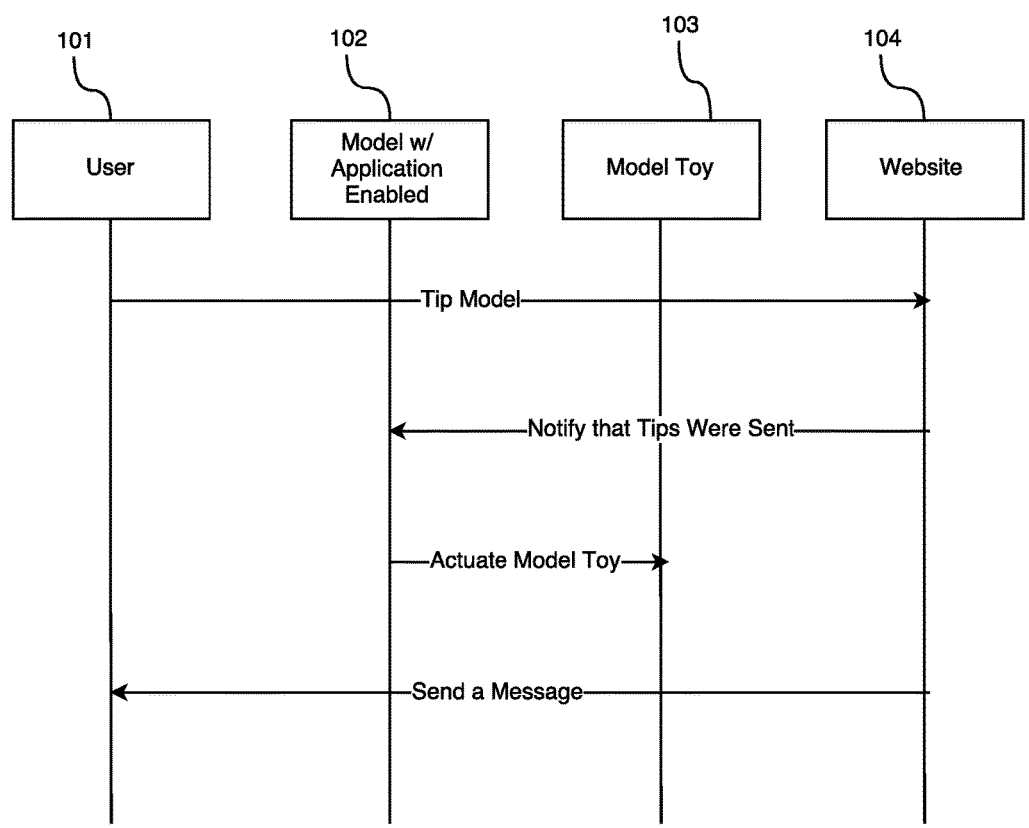
FIGS. 6 through 9 show exemplary diagrams of various embodiments of the present invention.
Figure 7:
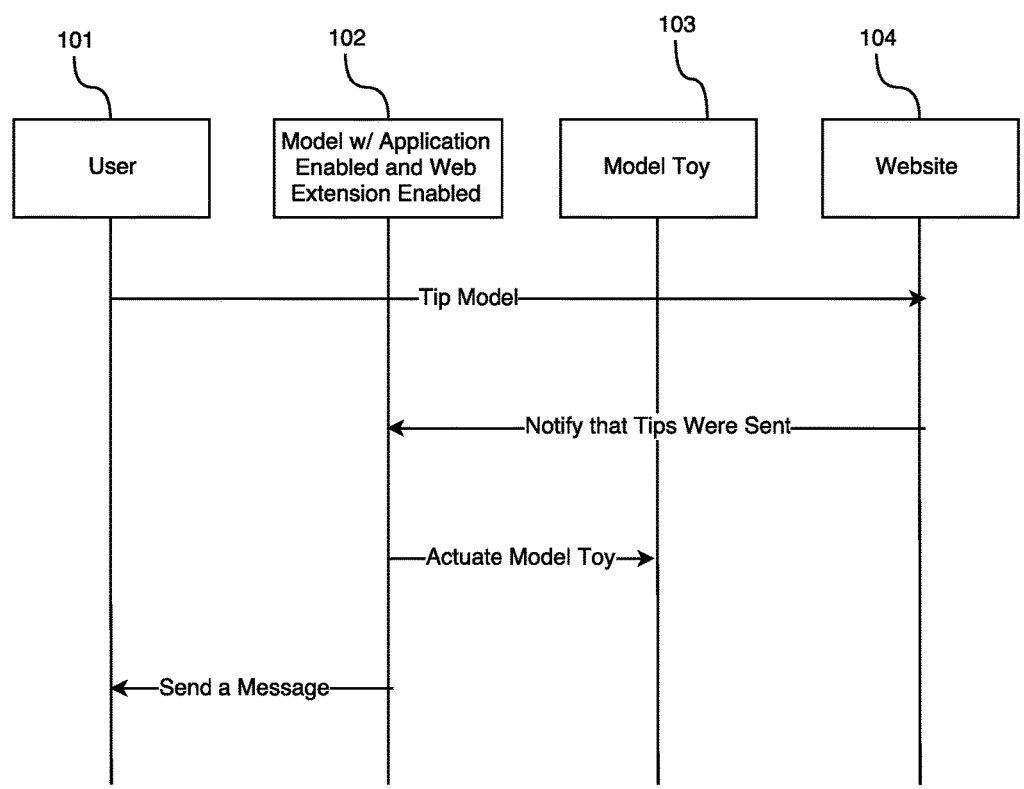
Figure 8:
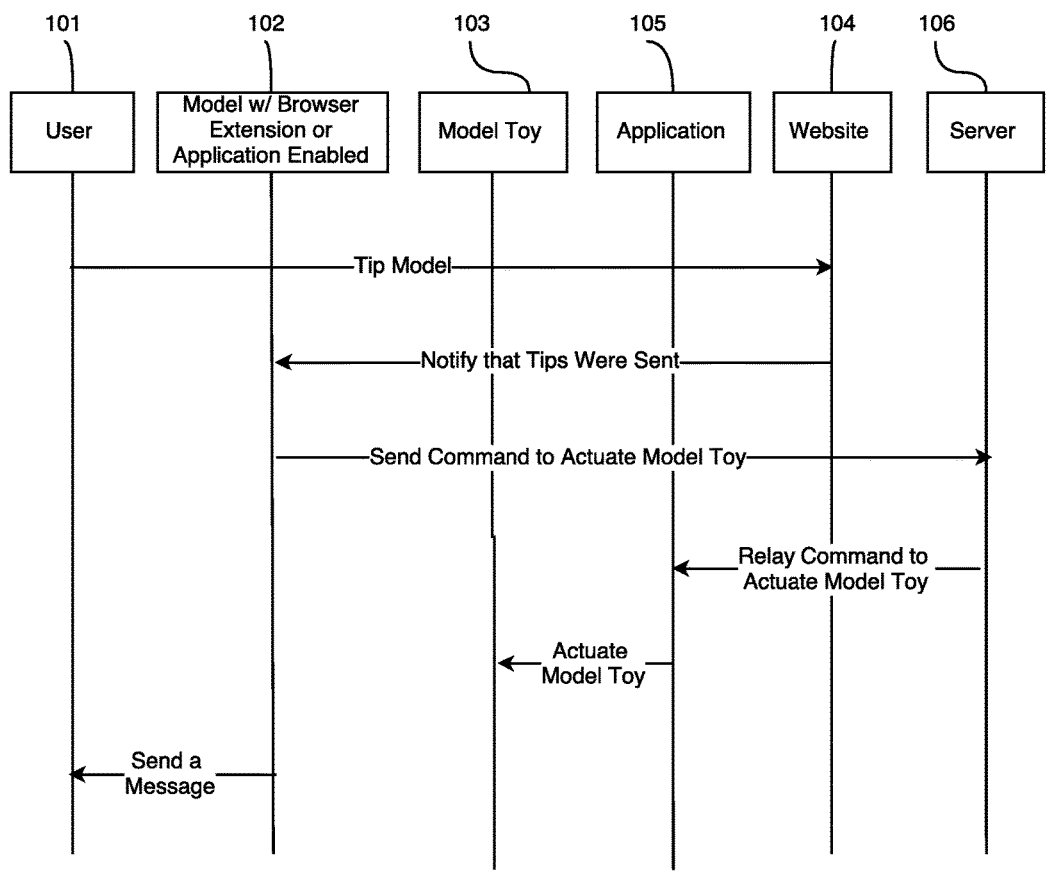
Figure 9:
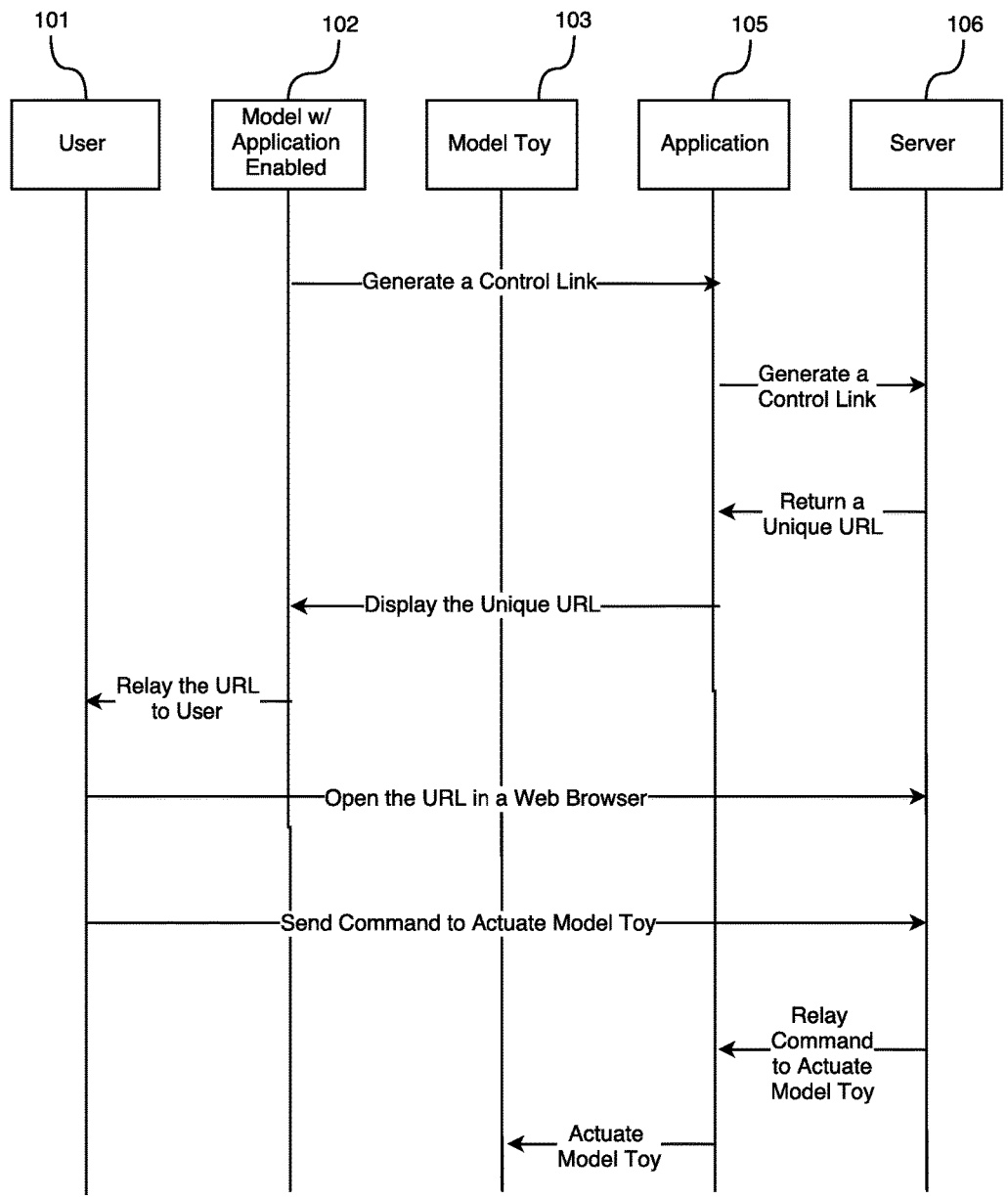

Another embodiment for the present method in operation is illustrated in FIG. 5. As indicated in block 301, the method further includes creating a user or a client account via a website 104 (FIGS. 1, 2), wherein the user account includes user name and password and input payment information, among other types of information associated with the user. As indicated in block 302, the user can select a model from a group of models to enter into a chat session and then begin a chat session with a model 303, wherein the chat session can be private, group, or public. Additionally, it is noted that one or more users may already be in a chat room, the chat room can be empty, or the model and the user can enter the chat room simultaneously.

As indicated in block 304, the user can enter a tip amount via the UI 113 (FIGS. 1, 2) of the website 104 (FIGS. 1, 2) during the chat session, for example, by typing in the amount of tip within a conversation thread, or by selecting a tip amount from a drop down menu. In some embodiments, the model's tip parameters may be made available to the user during the chat session so that the user can view the tip parameters and tip the model accordingly. In some embodiments, the user can tip the model anonymously, for example, during a group session. As indicated in block 305, the web browser extension 118 or the website 104 (FIGS. 1, 2) determines whether the user paid the correct tip amount (i.e., a tip amount that falls within one of the tip parameters defined by the model). If the user did not tip the correct amount, the web browser extension 118 (FIGS. 1, 2) can optionally notify the user to adjust the tip amount. Alternatively, the web browser extension 118 may not take any actions until the correct tip amount is input.

As indicated in block 306, if the correct tip amount is inputted, the web browser extension 118 (FIG. 1) or the website 104 determines whether there is an existing queue 306. As indicated in block 307, if there is no existing queue, the web browser extension 118 determines the corresponding predetermined act based on the tip amount and actuates the Wi-Fi-enabled 120 (FIG. 1) model toy 103 (FIG. 1) or the web browser extension 118 or the website 104 signals the application 105 (FIG. 2) to actuate the model toy 103 (FIG. 2). If there is an existing queue, the web browser extension 118 (FIG. 1) adds a tip reaction to queue 308. The user can continue chatting with the model and tip the model until the end of the chat session 309. In this regard, either the user and/or the model can end the chat session 310, or the chat session may be automatically ended after a predetermined period of time.

References are now made to FIGS. 6 through 9, which show exemplary diagrams of various embodiments of the present invention. In some embodiments, the user 101 can tip the model via the website 104, for example, by inputting the tip amount in a chat room. The model's UI or the model toy is notified of the tip via the web browser extension or the website. When the tip amount is validated and the model toy 103 is actuated in accordance with the model's tip parameters, the user can receive an automated message via the website 104, wherein the message comprises a thank you message or a predetermined message customized by the model 102.

In some embodiments, the model 102 may operate a model device having an application installed thereon, wherein the application is configured to automatically actuate the model toy 103 when it receives notification that tips were sent to the model via the website 104.

In some embodiments, the present system further comprises a server 106, wherein the model, via the application enabled on the model device, is configured to send command to the server 106 to actuate the model toy 103, and further wherein the server 106 is configured to relay the command to actuate the model toy 103. When the tip amount is validated, the web browser extension is configured to send an automated message to the user 101 as described above.

In some embodiments, the model 102 can generate a live control link via the application 105, which triggers the server 106 to output a unique Uniform Resource Locator (URL) via the browser or the website and relay it back to the application 105 to display it on its UI. The model 102 can relay the URL (i.e., the live control link) to the user 101. The user can open the URL in a web browser and access a control panel to control the model toy. The user is not required to tip the model when using the control panel. When the user enters a command to actuate the model toy, the server 106 relays the command back to the application 105 in order to actuate the model toy.

The following list of events may be considered a more concrete example of the functionality of the present system and method, in a realistic scenario involving a user and a model.
- I. Step 1: The model defines tipping parameters as follows:
  - a. 1 token: vibrate a model toy at a low speed for 2 seconds
  - b. 3-5 tokens: vibrate a model toy at a low speed and rotate a model toy at a medium speed for 4 seconds
- II. Step 2: A user and a model enter into an online chat room (e.g., on a website, a web application, and the like) to begin a chat session.
  - a. The model turns on the model toy by actuating the toy's control buttons or via the application installed on the model device (e.g., computer, mobile phone, etc.) and/or enables the UI to scan the chat sessions for tips.
- III. Step 3: The user views the model's tipping parameters and tips the model 1 token by inputting the tip amount in the conversation thread during the chat session.
- IV. Step 4: The tip amount is automatically detected via a web browser extension and analyzed to determine whether the tip amount falls within the model's tipping parameters.
- V. Step 5: The web browser extension validates the tip amount and determines the corresponding act based on the tip amount.
- VI. Step 6: The server transmits command signal to vibrate the model toy at a low speed for 2 seconds, either directly to the model toy or to the application, wherein the application is configured to relay the command signal to the model toy to actuate the same.
- VII. Step 7: The model sends a thank you message to the user.

The following list of events may be considered a more concrete example of the functionality of the present system and method, in a realistic scenario involving a live control link:
- I. Step 1: A model generates a live control link using a link generator of a web browser extension or a website.
  - a. The model can define the duration for which a user can use the live control feature (unlimited amount of time or a limited amount of time).
- II. Step 2: The model transmits the live control link to one or more users.
- III. Step 3: A user accesses the live control link and a virtual control panel pops up on UI.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A system for providing online communication, comprising:
   an operable adult toy configured to receive signals;
   a memory having stored thereon instructions;
   a processor to execute said instructions resulting in a software application; said software application configured to:
   define tip parameters, wherein said tip parameters comprise one or more ranges of tip amounts and actions correlating to each of said one or more ranges;

receive a tip from one or more users, wherein said tip comprises virtual currency;

determine whether said tip falls within said one or more ranges; and if said tip falls within said tip parameters, actuating said adult toy to perform a predefined act depending on an amount of said tip and to sexually stimulate an operator of said adult toy.

2. The system of claim 1, wherein said adult toy is Wi-Fi-enabled or Bluetooth-enabled; and said software application configured to actuate said adult toy.

3. The system of claim 1, further comprising:

a model device having an application installed thereon, wherein said application is configured to send commands to said adult toy to actuate said adult toy.

4. The system of claim 1, wherein said software application comprises a link generator for generating a live control link, further wherein said live control link comprises a unique Uniform Resource Locator (URL).

5. The system of claim 4, wherein said link generator is configured to invalidate previously generated live control link.

6. The system of claim 4, wherein said link generator is configured to build a queue of multiple links.

7. A system for, comprising:

one or more user devices and a model device in connection with a network;

each of said one or more user devices and said model device having a web browser thereon for accessing a website, said website providing an online chat room;

an adult toy in communication with said model device;

said web browser comprising a software application, said software application configured to:

define tip parameters, wherein said tip parameters comprise one or more ranges of tip amounts and actions correlating to each of said one or more ranges;

receive a tip from one or more users, wherein said tip comprises virtual currency;

determine whether said tip falls within said one or more ranges; and if said tip falls within said tip parameters, actuating said adult toy to perform a predefined act depending on an amount of said tip and to sexually stimulate an operator of said adult toy.

8. The system of claim 7, wherein said adult toy is Wi-Fi-enabled or Bluetooth-enabled; and said software application configured to actuate said adult toy.

9. The system of claim 7, wherein said model device comprises an application installed thereon;

said application configured to send commands to said adult toy to actuate said adult toy.

10. The system of claim 7, wherein said software application comprises a link generator for generating a live control link, further wherein said live control link comprises a unique Uniform Resource Locator (URL).

11. The system of claim 10, wherein said link generator is configured to invalidate previously generated live control link.

12. The system of claim 10, wherein said link generator is configured to build a queue of multiple links.

13. A computer based method for providing adult entertainment online, comprising the steps of:

defining tip parameters, wherein said tip parameters comprise one or more ranges of tip amounts and actions correlating to each of said one or more ranges;

activating an adult toy in communication with a model device;

starting a chat session with one or more users and a model via a website;

receiving a tip from said one or more users, wherein said tip comprises virtual currency;

determining whether said tip falls within said tip parameters;

if said tip falls within said tip parameters, actuating said adult toy to perform a predefined act depending on an amount of said tip and to sexually stimulate an operator of said adult toy.

14. The method of claim 13, wherein said adult toy is Wi-Fi-enabled or Bluetooth-enabled;

said adult toy configured to receive command signals from a server.

15. The method of claim 13, wherein said model device comprises an application installed thereon;

said application configured to send commands to said adult toy to actuate said adult toy.

16. The method of claim 13, further comprising the steps of: generating a live control link via a link generator, wherein said live control link comprises a unique Uniform Resource Locator (URL).

17. The method of claim 16, further comprising the steps of:

invalidating previously generated live control link via said link generator.

18. The method of claim 16, wherein said link generator is configured to build a queue of multiple links.

* * * * *